United States Patent [19]
LeClair

[11] Patent Number: 5,089,922
[45] Date of Patent: Feb. 18, 1992

[54] DISC DRIVE MOTOR SPINDLE HUB FOR HOLDING A DISC AND SPACER STACK FIRMLY IN PLACE

[75] Inventor: Stephen P. LeClair, Burnsville, Minn.

[73] Assignee: Seagate Technology, Inc., Scotts Valley, Calif.

[21] Appl. No.: 560,427

[22] Filed: Jul. 31, 1990

[51] Int. Cl.$^5$ .............................................. G11B 17/02
[52] U.S. Cl. ................................. 360/99.08; 360/99.12; 360/97.03; 360/98.01; 360/98.08
[58] Field of Search ............... 360/99.08, 98.01, 99.12, 360/98.08, 97.02, 97.03, 97.04, 133, 135

[56] References Cited

U.S. PATENT DOCUMENTS

| | | | |
|---|---|---|---|
| 4,065,799 | 12/1977 | Kaczeus | 360/133 |
| 4,429,336 | 1/1984 | Berupe et al. | 360/97.-3 |
| 4,471,395 | 9/1984 | Beck et al. | 360/97.03 |
| 4,561,035 | 12/1985 | McDorman et al. | 360/99.08 |
| 4,683,505 | 7/1987 | Schmidt et al. | 360/97.03 |
| 4,847,712 | 7/1989 | Crapo | 360/99.08 |
| 4,893,205 | 1/1990 | Hoppe et al. | 360/98.01 |
| 4,910,620 | 3/1990 | Olbirch | 360/99.12 |
| 4,965,686 | 10/1990 | Young et al. | 360/99.08 |

FOREIGN PATENT DOCUMENTS

| | | | |
|---|---|---|---|
| 56-130867 | 10/1981 | Japan | 360/98.01 |
| 63-103485 | 5/1988 | Japan | 360/99.12 |

Primary Examiner—Aristotelis Psitos
Assistant Examiner—Alfonso Garcia
Attorney, Agent, or Firm—Flehr, Hohbach, Test, Albritton & Herbert

[57] ABSTRACT

A specially designed disc mounting spindle hub having a disc mounting flange protruding frm a substantially cylindrical hub portion. The disc mounting flange has a raised area about the periphery of the flange upon which a disc rests. The remainder of the discs are alternately stacked with spacer rings upon the first disc. A clamping ring is attached to the substantially cylindrical hub portion opposite the disc mounting flange and, working cooperatively with the flange, imparts a force upon the disc and spacer ring stack to hold the discs in place. The maximum force applied to the stack is in line with the raised peripheral ara that the first disc rests upon. Additionally, the force bends the disc mounting flange. However, the first disc pivots upon the raised area maintaining its parallel orientation with respect to the other discs.

15 Claims, 3 Drawing Sheets

NO FORCE APPLIED

FORCE APPLIED

NO FORCE APPLIED

FORCE APPLIED

NO FORCE APPLIED

FORCE APPLIED

DISC DRIVE MOTOR SPINDLE HUB FOR HOLDING A DISC AND SPACER STACK FIRMLY IN PLACE

The present invention relates generally to disc drives and particularly to apparatus for mounting discs to the spindle hub of a disc drive.

BACKGROUND OF THE INVENTION

The present invention is an improvement on the apparatus used to mount discs on the spindle hub of a disc drive motor. Conventionally, the motor is located within the spindle hub of the disc drive and one or more discs coated with magnetic material are attached to the spindle hub.

To facilitate mounting the discs, a flange protrudes from the cylindrical hub and the first disc rests upon that flange. Alternating spacer rings and discs are stacked upon the first disc. A clamp ring is attached to the opposite end of the cylindrical hub to apply pressure to the disc and spacer ring stack, thereby firmly holding the discs in a fixed position against the cylindrical hub.

The motor rotatably drives the hub and discs, allowing the information stored thereupon to be accessed by a multitude of read/write heads. These heads "float" a small distance above the disc surface to sense the small magnetic signals stored upon the discs. The firm positioning of the discs is critical to accurate disc drive operation. The magnitude and location of the force imparted by the clamping ring is of critical importance to maintaining the position of the discs. Without proper clamping force, the discs, especially the first disc abutting the flange, will move perpendicular to the direction of rotational motion causing off-track error or the disc may impact the heads causing permanent disc drive damage.

Previously, the disc mounting flanges have been machined to have a flat mounting surface. This provided maximum surface area for the disc to rest upon, but did not position the clamping force in an optimal location. In this situation, the clamping force is maximized near the cylindrical hub. This force distribution will tend to bow the disc and spacer stack causing the discs to no longer be parallel to each other. In other words, the first disc, as well as others, would tend to move perpendicular to the direction of motion due to the clamping force distribution not having a maximum at a location away from the cylindrical hub. As the flange is bent downward forming an arc, a gap will form between the flange and the disc. The foregoing description of the prior art having a flat mounting surface is depicted in FIGS. 2A and 2B. Other prior art use a flat, but raised mounting area as shown in FIGS. 3A and 3B. This arrangement results in the same problems, i.e., unaligned clamping forces, as was discussed in connection with FIGS. 2A and 2B.

An objective of the current invention is to provide a specially designed disc mounting flange that imparts a clamping force that securely mounts the discs to the hub.

Another object of the present invention is to provide a disc mounting flange which has a raised disc resting surface which is in line with the clamping force applied by the clamping ring. The maximum force now occurs at a point away from the hub surface, and remains on that point while the flange bends under the clamping force.

SUMMARY OF THE INVENTION

In summary, the present invention is a specially designed disc mounting hub having a disc mounting flange protruding from a substantially cylindrical hub portion. The disc mounting flange has a raised area about the periphery of the flange upon which a disc rests. The remainder of the discs are alternately stacked with spacer rings upon the first disc. A clamping ring is attached to the cylindrical hub portion opposite the disc mounting flange and, working cooperatively with the flange, imparts a force upon the disc and spacer ring stack to hold the discs in place. The maximum force applied to the stack is in line with the raised peripheral area that the first disc rests upon. The clamping force causes the disc mounting flange to bend. However, the disc will rotate upon the raised area, and maintain a parallel position with respect to the other discs.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1A:
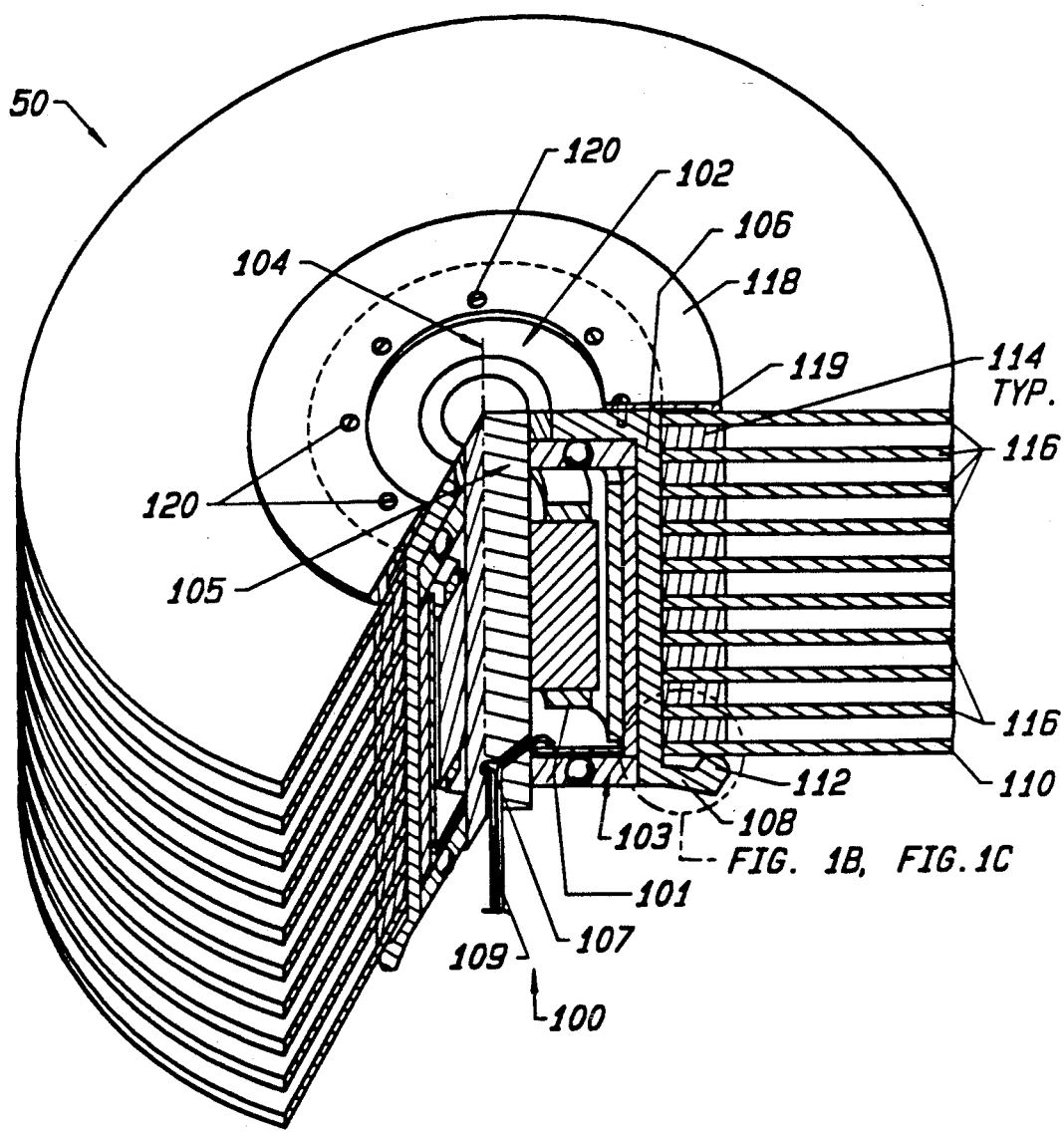
FIG 1A is a sectional view of a disc drive motor, disc mounting hub, and discs incorporating the preferred embodiment of the invention.

Referring to FIG 1A, there is shown a sectional view of a disc drive 50. The motor 100 causes the disc mounting spindle hub 102 to rotate about axis 104. The motor 100 consists of a stator 101 and a rotor 103. The stator 101 is fixed to a stationary shaft 105. Electric current pulses are supplied to the stator windings via wires 109 routed through an axial bore and two ports 107 in the shaft 105. The pulsating current activates the stator magnetics and propels the rotor 103 rotationally about the fixed stator 101 and shaft 105.

The disc mounting spindle hub 102 has a substantially cylindrical hub portion 106 and a disc mounting flange 108 protruding therefrom at one end. However, the protruding flange 108 could protrude at any location on the cylindrical hub portion, not just the end. The first disc 110 rests upon the raised area 112 of the disc mounting flange 108. The raised area 112 extends peripherally about the entire circumference of the disc mounting flange 108.

Spacers 114 and other discs 116 are alternately stacked upon the first disc 110. A clamping means in the form of a clamping ring 118 is attached to the cylindrical hub portion 106 at the end opposite the disc mounting flange 108. The clamping ring 118 is securely fastened by screws 120 such that an outer circumferential portion of the clamping ring imparts a clamping force to the stack of discs 116 and 110 and the spacers 114. The clamping ring 118 working in cooperation with the disc mounting flange 108 securely holds the discs 116 and 110 in a fixed position. Additionally, the raised area 112 is rounded to have a radius approximately equivalent to the radius of the clamp rings circumferential portion 119. For ease of machining, the radius is approximately 0.076 inch.

Figure 1B:
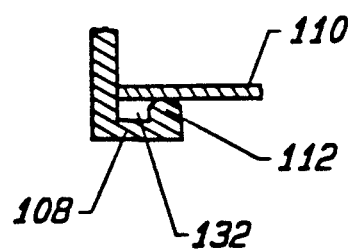
FIG 1B shows the preferred embodiment of the present invention.

FIG 1B depicts the inventive disc mounting flange 108 in an unloaded state; i.e., without an applied clamping force. The disc 110 rests at the apex of the rounded portion of the raised area 112.

Figure 1C:
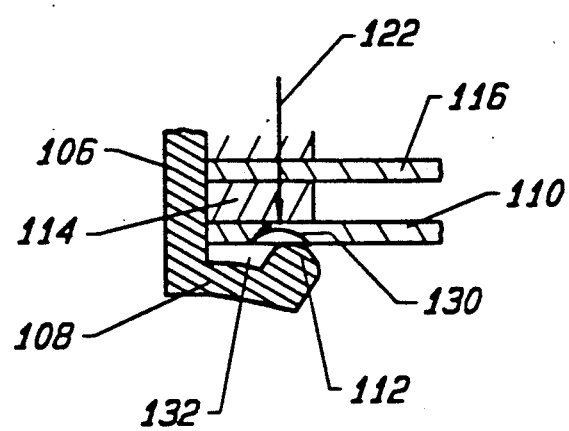
FIG 1C shows the preferred embodiment of the present invention including the clamping force vector.

FIG 1C shows a detailed sectional view of the disc mounting flange of FIG. 1 in a loaded state including a depiction of the maximum of the force vector 122 imparted by the clamping ring 118 upon the stack 116, 110, and 114. The force vector 122 is aligned with the disc mounting flange raised area 112. Note that the maximum of the force vector 122 is a distance away from the surface of the cylindrical hub portion 106. Thus, the discs are held tightly against the hub surface. Additionally, the force 122 bends the disc mounting flange into an arc. However, the disc pivots (arrow 130) about the raised area 112 and maintains its parallel orientation with respect to the other discs. Space 132 located adjacent to the raised area allows the disc to pivot freely.

Figure 1D:
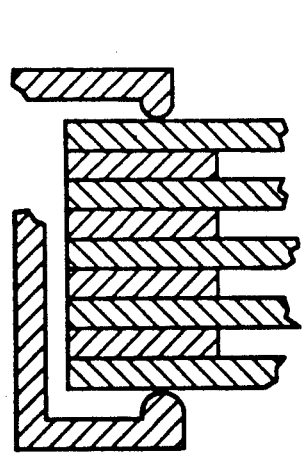
FIG. 1D depicts the preferred embodiment of the invention in an unloaded state.
Figure 1E:
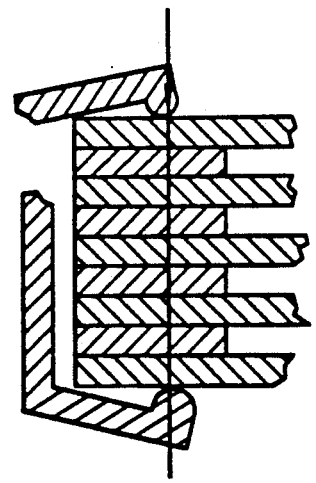
FIG. 1E shows the invention of FIG. 1D including the clamping force vector.
Figure 2A:
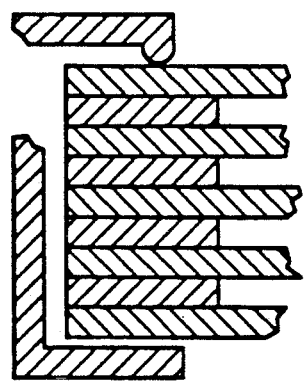
FIGS. 2A and 2B depict a prior art disc clamping apparatus in an unloaded state, FIG. 2A, and a loaded state, FIG. 2B.
Figure 2B:
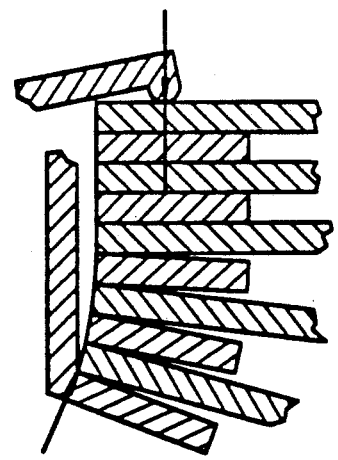
Figure 3A:
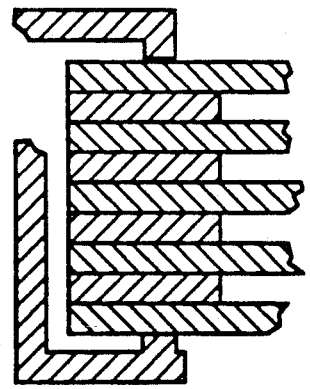
FIGS. 3A and 3B depict another prior art disc clamping apparatus in an unloaded state, FIG. 3A, and a loaded state, FIG. 3B.
Figure 3B:
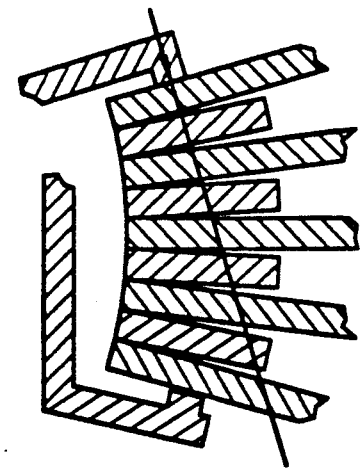

FIGS. 1D and 1E clearly depict the invention as maintaining the maximum clamping force imparted by the clamping means in line with the raised area of the flange. This is accomplished by rounding the raised areas on the clamping means and the disc mounting flange. As the clamping force is applied, the clamping means and the flange bend. This causes the rounded raised areas of both the clamping means and the flange to pivot on the discs which they contact and keeps the maximum clamping force imparted by the raised area of the clamping means in line with the raised area of the flange. Thus, the disc and spacer stack is held firmly in place and the discs remain parallel to each other.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A disc drive motor spindle hub comprising:
    a hub portion rotatably attached to a disc drive motor;
    a disc mounting flange, protruding from said hub portion, and having a rounded peripherally raised area with a radius, whereby a first disc rests against said raised area and any number of discs and spacers are stacked alternately thereupon to form a disc and spacer stack; and
    clamping means attached to an end of said hub portion, having a rounded raised contact area in line with and facing said rounded raised area of said disc mounting flange, and working cooperatively with said disc mounting flange for applying a clamping force to said disc and spacer stack, whereby said disc mounting flange bends due to said clamping force, causing said first disc to pivot upon said raised areas while maintaining a substantially parallel orientation with respect to said discs, and whereby a maximum of said clamping force is in line with said raised areas so that said disc and spacer stack is held firmly in a fixed position.

2. A disc drive motor spindle hub as claimed in claim 1 wherein said rounded raised contact area of said clamping means has a radius substantially equivalent to said radius of said disc mounting flange's rounded raised area.

3. A disc drive motor spindle hub as claimed in claim 1 wherein said clamping means comprises a clamp ring having a circumferential portion from which said rounded raised contact area rises.

4. A disc drive motor spindle hub as claimed in claim 3 wherein said rounded raised contact area of said clamp ring has a radius substantially equivalent to said radius of said disc mounting flange's rounded raised area.

5. A disc drive motor spindle hub as claimed in claim 1 wherein said hub portion has an upper and lower end and said disc mounting flange protrudes from said lower end of said hub portion.

6. A disc drive motor spindle hub as claimed in claim 1 wherein said hub portion has an upper and lower end and said clamping means is attached to said upper end of said hub portion.

7. A disc drive motor spindle hub as claimed in claim 2 wherein said hub portion has an upper and lower end and said disc mounting flange protrudes from said lower end of said hub portion.

8. A disc drive motor spindle hub as claimed in claim 2 wherein said hub portion has an upper and lower end and said clamping means is attached to said upper end of said hub portion.

9. A disc drive motor spindle hub as claimed in claim 5 wherein said clamping means is attached to said upper end of said hub portion.

10. A disc drive motor spindle hub as claimed in claim 5 wherein said clamping means is attached to said upper end of said hub portion and said rounded raised contact area of said clamping means has a radius substantially equivalent to said radius of said disc mounting flange's rounded raised area.

11. A disc drive motor spindle hub for mounting at least one disc comprising:
    a hub portion rotatably attached to a disc drive motor and having an upper and a lower end;
    a disc mounting flange, protruding from said hub portion at said lower end, and having a rounded peripherally raised area with a radius, whereby a first disc rests against said raised area and any number of discs and spacers are stacked alternately thereupon to form a disc and spacer stack; and
    a clamp ring, attached to said upper end of said hub portion, and having a circumferential portion with a rounded raised area with a radius substantially equivalent to said radius of said disc mounting flange's rounded raised area, said clamp ring's raised area being in line with said disc mounting flange's raised area, said clamp ring also working cooperatively with said disc mounting flange for applying a clamping force to said disc and spacer stack, whereby said disc mounting flange bends due to said clamping force causing said first disc to pivot upon said raised area maintaining a substantially parallel orientation with respect to said discs, and whereby a maximum of said clamping force is in line with said raised areas so that said disc and spacer stack is held firmly in a fixed position.

12. A disc drive motor spindle hub as claimed in claim 11 wherein said disc mounting flange has an end and said rounded raised area of said disc mounting flange is located near said end of said disc mounting flange.

13. A disc drive motor spindle hub as claimed in claim 11 wherein said hub portion is substantially cylindrical.

14. A disc drive motor spindle hub as claimed in claim 12 wherein said hub portion is substantially cylindrical.

15. A disc drive comprising:
- a spindle hub having:
  - a substantially cylindrical hub portion with an upper and lower end;
  - an inner circumferential surface;
  - a disc mounting flange, protruding from said lower end of said substantially cylindrical hub portion, and having an end and a rounded peripherally raised area with a radius, said raised area being located near said end of said disc mounting flange, whereby a first disc rests against said raised area and any number of discs and spacers are stacked alternately thereupon to form a disc and spacer stack; and
  - a clamp ring, attached to said upper end of said substantially cylindrical hub portion, and having a circumferential portion with a rounded raised area with a radius substantially equivalent to said radius of said disc mounting flange's rounded raised area, said clamp ring's rounded raised area being in line with said disc mounting flange's rounded raised area, said clamp ring also working cooperatively with said raised area of said disc mounting flange for applying a clamping force to said disc and spacer stack, whereby said disc mounting flange bends due to said clamping force and said first disc pivots upon said raised area maintaining a substantially parallel orientation with respect to said discs, and whereby a maximum of said clamping force is in line with said raised areas so that said disc and spacer stack is held firmly in a fixed position;
- a stationary shaft having;
  - a circumferential surface; and
  - an axial bore in one end, said axial bore extending partially along an axis about which a spindle hub rotates and being connected to at least one port which connects said axial bore to said circumferential surface of said shaft;
- a stator fixedly attached to said stationary shaft;
- a plurality of wires routed through said axial bore;
- at least one port combination for supplying current to said stator;
- a bearing means for rotatably attaching said spindle hub to said stationary shaft; and
- a rotor fixedly attached to said inner circumferential surface of said spindle hub.

* * * * *